(12) United States Patent
Haines

(10) Patent No.: US 7,157,112 B2
(45) Date of Patent: Jan. 2, 2007

(54) INFRARED REFLECTIVE WALL PAINT

(75) Inventor: Jay A. Haines, Panama City, FL (US)

(73) Assignee: Textured Coatings of America, Inc., Panama City, FL (US)

( * ) Notice: Subject to any disclaimer, the term of this patent is extended or adjusted under 35 U.S.C. 154(b) by 195 days.

(21) Appl. No.: 10/811,065

(22) Filed: Mar. 26, 2004

(65) Prior Publication Data

US 2005/0215685 A1 Sep. 29, 2005

(51) Int. Cl.
B05B 5/00 (2006.01)

(52) U.S. Cl. ............ 427/160; 427/180; 427/205; 427/419.2; 106/297.19; 106/400; 106/401; 106/712

(58) Field of Classification Search .......... 427/160, 427/180, 205, 419.2; 106/287.19, 400, 401, 106/712
See application file for complete search history.

(56) References Cited

U.S. PATENT DOCUMENTS

| | | | |
|---|---|---|---|
| 4,546,007 A * | 10/1985 | Abe et al. ................ | 427/8 |
| 4,916,014 A | 4/1990 | Weber et al. | |
| 5,049,592 A | 9/1991 | Kronstein | |
| 5,320,781 A | 6/1994 | Stahlecker et al. | |
| 5,749,946 A | 5/1998 | Glausch et al. | |
| 5,883,180 A * | 3/1999 | Slama ................ | 524/505 |
| 5,962,143 A * | 10/1999 | Krauthauser et al. .... | 428/425.1 |
| 5,990,219 A | 11/1999 | Sakai et al. | |
| 6,004,894 A | 12/1999 | Faust et al. | |
| 6,110,270 A * | 8/2000 | Beckenhauer ............. | 106/724 |
| 6,139,962 A | 10/2000 | Herget et al. | |
| 6,171,383 B1 * | 1/2001 | Sakoske et al. .......... | 106/479 |
| 6,174,360 B1 | 1/2001 | Sliwinski et al. | |
| 6,359,030 B1 * | 3/2002 | Tsuda et al. ............. | 523/201 |
| 6,366,397 B1 * | 4/2002 | Genjima et al. ........... | 359/359 |
| 6,416,868 B1 * | 7/2002 | Sullivan et al. ........... | 428/432 |
| 6,454,848 B1 | 9/2002 | Sliwinski et al. | |
| 6,466,647 B1 | 10/2002 | Tennyson | |
| 6,521,038 B1 * | 2/2003 | Yanagimoto et al. ....... | 106/493 |
| 6,616,744 B1 | 9/2003 | Sainz et al. | |
| 6,676,742 B1 * | 1/2004 | Gilli ........................ | 106/464 |
| 6,787,585 B1 * | 9/2004 | Rose et al. ................ | 523/135 |
| 2002/0134282 A1 | 9/2002 | Osterlag et al. | |
| 2004/0099807 A1 * | 5/2004 | Shelley et al. ......... | 250/339.01 |

FOREIGN PATENT DOCUMENTS

| | | |
|---|---|---|
| EP | 0 016 243 A | 10/1980 |
| EP | 0 061 223 A | 9/1982 |
| EP | 0 270 472 A | 6/1988 |
| EP | 1 029 901 A | 1/2000 |
| JP | 63-33406 A * | 2/1988 |
| JP | 2000-212475 A * | 8/2002 |
| JP | 2002-331611 A * | 11/2002 |
| JP | 2004-010853 A * | 1/2004 |

OTHER PUBLICATIONS

Mills-Senn, P., "There Goes The Sun." PWC, Jan.-Feb. 2004, p. 53-54 and 68.
International Search Report from international application No. PCT/US2005/010762.
TEX COTE® Super Cote™ Classic Primer Technical Data Sheet (dated Nov. 2003), color off white.
TEX COTE® Super Cote™ Textured Primer Technical Data Sheet (dated Nov. 2003), color off white.
TEX COTE® Material Safety Data Sheet (dated Aug. 2, 2002), product name classic primer water based, Section III, appearance and odor, white, pasty liquid.

* cited by examiner

Primary Examiner—Alain L. Bashore
(74) Attorney, Agent, or Firm—Foley & Lardner, LLP

(57) ABSTRACT

Presented are methods for reducing energy consumption by coating external vertical walls of a building with a wall paint comprising reflective metal oxide pigments. Methods for painting external vertical walls as well as compositions comprising base paint combined with reflective metal oxide pigments are also presented.

30 Claims, No Drawings

INFRARED REFLECTIVE WALL PAINT

FIELD OF THE INVENTION

The present invention relates generally to the field of heat reflective compositions. The invention also pertains generally to methods of promoting energy conservation.

BACKGROUND OF THE INVENTION

The information provided herein and references cited are provided solely to assist the understanding of the reader, and does not constitute an admission that any of the references or information is prior art to the present invention.

Occupants of buildings located in warm weather climate zones often expend substantial amounts of energy to cool the interior of the building, e.g. air conditioning. One way to reduce energy consumption and energy demand is to employ energy-saving coatings on the building's exterior. Typically, these coatings act to reduce heat load to a building by reflecting away sunlight and/or by blocking the transfer of heat. These coatings have the purpose of reducing a structure's heat gain when the weather is hot, and heat loss when weather is cold.

Energy costs, in some cases, can be significantly reduced with the use of some energy-savings coatings. However, the amount saved can vary and is dependent on the building structure itself, i.e. age, condition, color, insulation already present, etc. The environment also exerts a significant influence. For instance, those in hotter climates may notice more savings than those in cooler areas. "In fact, assessing potential energy savings is somewhat of an art as well as a science" (Mills-Senn, P., "The Sun", PWC, January–February 2004, p. 53–75; quoted citation on p. 54; the entire disclosure of which is incorporated herein by reference).

Energy-savings coatings can be described in terms of its reflectivity or reflectance property, which indicates the degree to which a coating reflects light, e.g., percentage of light that is reflected away from the surface. Another characteristic property is emissivity, which can be defined as the ability of a surface to radiate or emit energy in the form of longwave infrared radiation. Emissivity is represented by a value ranging from zero to one, wherein values closer to one correlate with lower effectiveness of the surface at impeding radiant heat transfer. For example, a coating with an emittance value of 0.25 will be more effective at blocking radiant heat transfer than a coating that has an emittance value of 0.75.

Energy-saving coatings are most typically applied to roofs on the roof's exterior or to its underside, and are generally referred to as "radiation control coatings" or "radiant barriers" for interior roof coatings. Additionally, energy-saving coatings can also be applied to exterior and interior walls in much the same way as those used on roofs (Mills-Senn, P., supra, see p. 53).

The following are examples of energy-saving wall and/or roof coatings (Mills-Senn, P., supra, see p. 67–68).

Nationwide Chemical Coating (Bradenton, Fla.) manufactures a line of elastomeric ceramic reflective wall coatings under the name Ultra Seal, Ultra Satin, and Ultra Kote. The ceramics in these coatings provide the additional benefit of dissipating heat buildup more efficiently.

SPM Thermo-Shield (Custer, S.D.) manufactures wall coatings under the Thermo-Shield brand which uses hollow, vacuumed ceramic bubbles as the primary filler. The Thermo-Shield coatings are tintable, although white is the recommended color for best energy savings.

Advanced Coating Systems (Atlanta, Ga.) manufactures reflective acrylic elastomeric wall coatings that are primarily white but can be tinted. These coatings dry to a rubber-like film that is flexible and water-proof.

Cerama-Tech International (San Diego, Calif.) manufactures a ceramic coating that is reflective, emissive, and elastomeric, that can be sprayed onto any exterior or interior paintable surface. The coating is white but can be tinted to almost any mid-range color.

Sherwin-Williams manufactures a one-part latex-based coating designed for residential attics, decking, and coated commercial metal decking. The coating, marketed under the name E-Barrier Reflective Coating, reflects radiant energy via microscopic metal particles.

The following disclosures describe reflective coatings, compositions, or materials.

U.S. Pat. No. 4,916,014 reports infrared reflecting compositions for coating of structures exposed to sunlight which reduce heating of the structure by the sun. Infrared reflecting materials described include metals, such as noble metals, zinc, nickel, copper, or aluminum.

U.S. Pat. No. 6,004,894 reports porcelain enamel compositions for use in forming infrared reflective coatings comprising a glass component and a cerium oxide component.

U.S. Pat. Nos. 6,174,360 and 6,454,848 (the disclosures of which are incorporated herein by reference) report building materials, such as stucco, roofing tiles, roofing granules, roofing shingles, or brick, comprising infrared reflective pigments having a corundum-hematite crystalline structure.

U.S. Pat. No. 6,468,647 report infrared reflect visually colored metal substrates or metal-coated particles prepared by burnishing colored pigments into the metal.

SUMMARY OF THE INVENTION

The present invention concerns methods for reducing energy consumption of a building by coating one or more external vertical walls of the building with a heat reflective wall paint. Wall paint compositions presented herein contain at least one heat reflective metal oxide pigment, and are applied to vertical walls of a building's exterior. Application of the present paint compositions to exterior vertical walls of a building provide for lower absorption of solar energy through the coated wall. This, in turn, results in lower wall surface temperatures and lower heat transfer through the coated walls. Thus, the interior temperature of the building is cooler and consequently, less energy is consumed to cool the interior of said building. Vertical walls coated with the present heat reflective wall paints can be effective in lowering cooling energy requirements. Coated walls with no or sparse amounts of insulation may exhibit greater reductions in cooling energy requirements.

The phrase "energy consumption" refers to the usage or consumption of conventional forms of energy, e.g. electricity, gas, etc. Thus, the reduction of energy consumption in a building pertains to lower usage of, for example, electricity in said building.

The phrase "coating" refers to applying, layering, or covering vertical walls with the present wall paint compositions. Coating of the exterior surface of vertical walls with the present wall paint compositions may be performed by any conventional means, such as with brushes, rollers, sprayers, etc.

The phrase "wall paint" refers to a fluid binder liquid composition, i.e. resin and solvent, used for coating, applying, layering, or covering vertical walls. Wall paints may be clear, colored, transparent, or nearly transparent. Wall paints embrace varnishes, stains, and finishes. Wall paints may be in any suitable formulation for application to vertical walls, such as water-based, oil-based, or acrylic-based formulations.

The phrase "external vertical walls" refers to the exterior surface of any upright, vertical or nearly vertical structure construction forming an exterior siding of a building. Vertical walls may be composed of masonry, wood, plaster, or any other suitable building material. Typically, a building possess at least four vertical walls.

The phrase "heat reflective" refers to an ability to reflect solar light from a surface. Reflectance or reflectivity is expressed in terms of percentage of incident solar light that is reflected away from a surface. Preferably, external vertical walls coated with the present wall paint compositions exhibit an infrared reflectance above 30%, preferably above 50%, and preferably above 70%.

The phrase "heat reflective" also embraces an emissivity property, defined as the ability to radiate or emit energy in the form of longwave infrared radiation. Emissivity values range from zero to one, wherein values closer to one correlate with lower effectiveness of the surface at impeding radiant heat transfer. Consequently, surfaces with low emissivity values also exhibit lower surface temperatures.

Preferably, external vertical walls coated with the present wall paint compositions have lowered surface temperatures by at least 20° F., preferably by at least 30° F., preferably by at least 40° F., and preferably by at least 50° F. Factors which may affect measurements of surface temperature include, for example, angle of sunlight, time of day, time of year, and climatic conditions.

The phrase "metal oxide" refers to oxygen containing species of various metals, such as aluminum, antimony, bismuth, boron, chrome, cobalt, gallium, indium, iron, lanthanum, lithium, magnesium, manganese, molybdenum, neodymium, nickel, niobium, silium, tin, vanadium, or zinc. Preferable metal oxides that may be employed according to the invention include $Cr_2O_3$, $Al_2O_3$, $V_2O_3$, $Ga_2O_3$, $Fe_2O_3$, $Mn_2O_3$, $Ti_2O_3$, $In_2O_3$, $TiBO_3$, $NiTiO_3$, $MgTiO_3$, $CoTiO_3$, $ZnTiO_3$, $FeTiO_3$, $MnTiO_3$, $CrBO_3$, $NiCrO_3$, $FeBO_3$, $FeMoO_3$, $FeSn(BO_3)_2$, $BiFeO_3$, $AlBO_3$, $Mg_3Al_2Si_3O_{12}$, $NdAlO_3$, $LaAlO_3$, $MnSnO_3$, $LiNbO_3$, $LaCoO_3$, $MgSiO_3$, $ZnSiO_3$, or $Mn(Sb,Fe)O_3$.

The phrase "corundum-hematite crystal lattice structure" refers to a discrete crystalline structure exhibited by metal oxide pigments presented herein. Corundum-hematite crystalline structures can be obtained by using certain metal oxides, or precursors thereof, which form corundum-hematite lattice as host components and incorporating into them as guest components metal oxides or precursors thereof. Such corundum-hematite crystalline structures and methods of producing metal oxides of such structures are well known in the art and are described, for example, in U.S. Pat. Nos. 6,174,360, 6,454,848, and 6,616,744, the disclosures of all of which are incorporated herein by reference. Additionally, a host component having a corundum-hematite crystalline structure which contains as a guest component one or more elements from the group consisting of aluminum, antimony, bismuth, boron, chrome, cobalt, gallium, indium, iron, lanthanum, lithium, magnesium, manganese, molybdenum, neodymium, nickel, niobium, silium, tin, vanadium, and zinc may be used in the present wall paint compositions.

The phrase "infrared wavelengths" refers to wavelengths of light in the infrared region. Wavelengths in the infrared region range from 750 to 2500 nm, such as from 800 to 2450 nm, such as from 900 to 2400 nm, such as from 1000 to 2300 nm, such as from 1500 to 2000 nm.

The phrase "white" refers to an achromatic color of maximum lightness, e.g. a color which reflects nearly all light of all visible wavelengths. For example, in preferred embodiments, heat reflective wall paint compositions presented herein are not white. Preferably, the present wall paints are of a dark color (i.e. of a shade tending toward black in comparison with other shades), such as black, blue, green, yellow, red, or any combination thereof. Thus, external vertical walls can be painted with a variety of colored wall paint compositions presented herein. Advantageously, external vertical walls coated with paint compositions of the present invention need not be white in order to exhibit a lower surface temperature.

Multiple metal oxide pigments may be mixed together to obtain wall paint compositions of a desired hue, so long as the heat reflective property of the resultant composition is maintained. In addition, colored pigments other than heat reflective metal oxide pigments may be added to the present wall paint compositions, such as C.I. Pigment Red 202, C.I. Pigment Red 122, C.I. Pigment Red 179, C.I. Pigment Red 170, C.I. Pigment Red 144, C.I. Pigment Red 177, C.I. Pigment Red 254, C.I. Pigment Red 255, C.I. Pigment Red 264, C.I. Pigment Brown 23, C.I. Pigment Yellow 109, C.I. Pigment Yellow 110, C.I. Pigment Yellow 147, C.I. Pigment Orange 61, C.I. Pigment Orange 71, C.I. Pigment Orange 73, C.I. Pigment Orange 48, C.I. Pigment Orange 49, C.I. Pigment Blue 15, C.I. Pigment Blue 60, C.I. Pigment Violet 23, C.I. Pigment Violet 37, C.I. Pigment Violet 19, C.I. Pigment Green 7, and C.I. Pigment Green 36, or a mixture or solid solution thereof. The particular choice of pigments can be selected so as to impart superior weatherability, color retention, and low gloss uniformity to coated external vertical walls when exposed to high ultra violet sunshine.

In an aspect of the invention, methods of painting external vertical walls of a house by applying a heat reflective wall paint, containing at least one heat reflective metal oxide pigment, are presented herein. Preferably, such methods are used to paint the external walls of a residential building, e.g. house. The present wall paints may be applied to external vertical walls in a single coat, and can be applied with or without the use of a primer. Walls coated with the present wall paints exhibit enhanced weathering and durability, and can reduce chipping, flaking, and peeling. The present wall paints may be applied to vertical walls composed of, for example, wood, stucco, or brick.

Another aspect of the invention is directed to compositions of paint for application to external vertical walls, and at least one heat reflective metal oxide pigment.

Yet another aspect of the invention is directed to methods for preparing vertical wall paint by mixing at least one heat reflective metal oxide pigment to a paint formulation. In some embodiments, a synthetic flatting aid can be added to the paint formulation. As used herein, the term "flatting aid" refers to a material added to paint formulations which serve to flatten out gloss. Representative flatting aids include silicas of any grade, such as fine silica; clays, diatomaceous earth; liquid additives; or any suitable material having high oil absorption.

DETAILED DESCRIPTION OF THE PREFERRED EMBODIMENTS

In accordance with the invention, wall paint compositions presented herein comprise at least one heat reflective metal oxide pigment. Heat reflective metal oxide pigments that are preferably used in the present wall paint compositions are sold by Ferro Corporation (Cleveland, Ohio) as Cool Colors™ & Eclipse™ pigments. Exemplary IR reflective pigments sold by Ferro Corporation include "new black" (Ferro product no. V-799), "old black" (Ferro product no. V-797), "turquoise" (Ferro product no. PC-5686), "blue" (Ferro product no. PC-9250), "camouflage green" (Ferro product no. V-12600), "IR green" (Ferro product no. V-12650), "autumn gold" (Ferro product no. PC9158), "yellow" (Ferro product no. PC-9416), and "red" (Ferro product nos. V-13810 and V-13815).

Heat reflective metal oxide pigments of the present compositions can be prepared by various methods known in the art. Preferably, these pigments are formed using one or more metal alloys that can be incorporated as cations into the corundum-hematite crystal lattice structure. For instance, one or more metal alloys is milled to a mean particle size of less than about 10 microns, mixed with other metal oxides, and then the mixture is calcined in the presence of oxygen in a rotary kiln at temperatures ranging from about 800° C. to about 1200° C. to form the pigment. U.S. Pat. No. 6,616,744, the disclosure of which is incorporated herein by reference, describes an exemplary method for forming metal oxide pigments employed in the present invention.

Wall paint compositions of the present invention comprise at least one metal oxide pigment capable of reflecting light of infrared wavelengths. Spectroscopic methods for determining reflectance values of a solid substance, including metal oxide pigments, are well known in the art and include, for example, pressing a neat powder of the solid substance and placing the powder sample into a chamber of a spectrophotometer equipped with a reflectance spectroscopy accessory. Such reflectance spectroscopic methods are described, for example, in U.S. Pat. No. 6,454,848.

Wall paint compositions of the present invention may be solvent-based, oil-based, or water-based. Solvent-based and oil-based wall paint formulations are well known in the art and include, for example, XL-70 with mineral spirit and toluene; styrene acrylic with aromatic 100 based solvent; vinyl acrylic with mineral spirits and aromatic 100 based solvent; and alkyd coating. Water-based wall paint formulations are well known in the art and include, for example, acrylic resin. In certain embodiments, the present wall paint compositions are water-based formulations comprising a 100% acrylic resin.

Preferably, wall paints of the present invention comprise from 35 to 50% solids by weight, from 30 to 40% solids by volume, from 3 to 7% organic solvent, and from 0 to 30% weight percent pigment (pigments include metal oxide pigments, titanium dioxide, and fillers such as formed silica, titanium extenders, and clay). In certain embodiments, wall paint formulations of the invention comprise from 37 to 47% solids by weight, such as from 39 to 45% solids by weight, such as from 41 to 43% solids by weight. In certain embodiments, wall paint formulations of the invention comprise from 32 to 38% solids by volume, such as from 34 to 36% solids by volume. Preferably, wall paints of the present invention have a density from about 9.1 to about 10.8 pounds per gallon, such as from 9.5 to 10.5 pounds per gallon.

Preferred wall paint formulations used according to the invention are TEX•COTE® SUPER•COTE™, which have varying sheen finishes called Satin Finish Enamel and Platinum Flat Finish, manufactured by Textured Coatings of America (Panama City, Fla.). Other preferred wall paint formulations manufactured by Textured Coatings of America include TEX•COTE® TRIM•COTE™, which have varying sheen finishes called Satin Finish and Semi-Gloss Finish. Both the SUPER•COTE™ and TRIM•COTE™ products from Textured Coatings of America comprise heat reflective metal oxide pigments, and can be used to paint external vertical walls as well as trimmings on external vertical walls.

The TEX•COTE® SUPER•COTE™ and TRIM•COTE™ is a water-based system formulated with a 100% acrylic resin. Pigments in the TEX•COTE® formulation are selected to provide hide (e.g. coverage), superior weatherability, color retention and low gloss uniformity when exposed to high ultra violet exposure from sunshine. Infrared reflective pigments are added in the TEX•COTE® formulation to reduce heat built-up, to keep the coating cooler, and to save energy. Colors stay vibrant longer due to the infrared reflective pigments used in the SUPER•COTE™ and TRIM•COTE™ formulation. A synthetic flatting aid has been added to the TEX•COTE® formulation to sustain long term "satin finish". The rheology of the TEX•COTE® system provides flow, leveling and the necessary wet edge during application. The addition of infrared reflective pigments as well as ultraviolet and visible light stabilizers improves the weatherability of the TEX•COTE® coating. Representative TEX•COTE® SUPER•COTE™ and TRIM•COTE™ formulations are described in the examples below.

Wall paints of the present invention may be applied to vertical walls using a variety of well known methods, such as brush, roller, or commercial grade airless sprayer. For instance, platinum SUPER•COTE™ is normally applied at 8 mils (1 mil=0.001 inch) wet film thickness, but on heavy textures, the coating may be applied up to 10 mils. This is approximately equivalent to 2.8 to 3.8 dry mils film thickness. Coverage rates for SUPER•COTE™ vary from about 160 to about 250 square feet per gallon depending on surface porosity and texture. Representative procedures for applying SUPER•COTE™ are described in the examples below.

Wall paint compositions of the present invention can further comprise various conventional paint additives, such as dispersing aids, anti-settling aids, wetting aids, thickening agents, extenders, plasticizers, stabilizers, light stabilizers, antifoams, defoamers, catalysts, texture-improving agents and/or antiflocculating agents. Conventional paint additives are well known and are described, for example, in "C-209 Additives for Paints" by George Innes, February 1998, the disclosure of which is incorporated herein by reference. The amounts of such additives are routinely optimized by the ordinary skilled artisan so as to achieve desired properties in the wall paint, such as thickness, texture, handling, and fluidity.

Wall paint compositions of the present invention may comprise various rheology modifiers or rheology additives (such as acrysol), wetting agents, defoamers, dispersants and/or co-dispersants, and microbicides and/or fungicides. To achieve enhanced weatherability, the present wall paints may comprise UV (ultra-violet) absorbers such as tinuvin.

Wall paint compositions of the present invention may further comprise heat reflective substances other than metal oxide pigments discussed herein. For instance, wall paint compositions may further comprise ceramic or elastomeric substances, which are heat and/or infrared reflective, so as to provide additional heat reflective benefits.

Wall paint compositions presented herein may be applied as many times necessary so as to achieve sufficient coating of external vertical walls. For example, wall paint may be applied from about 8 mils to about 10 mils wet film thickness, which is equivalent to from about 2.8 to about 3.8 dry mils film thickness.

Wall paint compositions presented herein may be applied to vertical walls after coating with primers. For instance, vertical walls may be painted with a primer before application of the present wall paint compositions. Exemplary primers include TEX•COTE® SUPER•COTE™ Classic Primer, a multi-functional low V.O.C. acrylic copolymer pigmented latex system. The SUPER•COTE™ primer contains rheology modifiers to provide non-sag, leveling and film build when freshly applied. This product is ready to use where uncured cementitious surfaces are common, or where excessive amounts of alkali are present in the substrate. The SUPER•COTE™ primer is also for use on wood or approved metal surfaces. Application rate is approximately 70 to 80 square feet per gallon on heavy laced stucco; approximately 80 to 100 square feet per gallon on lighter textures, and smooth surfaces (16 to 20 mils wet, 9 to 12 mils dry film thickness) via brush, spray or roller. Coverage will depend on surface porosity, and no thinning is required. Desirable results are obtained, for example, when the primer is applied with an airless sprayer, and back rolled for desired finish.

Another exemplary primer which may be optionally applied to vertical walls before application of the present wall paint compositions is SUPER•COTE™ Textured Primer, a high build water based system based on a cross-linking acrylic resin binder. This cured primer membrane provides fill, texture and weatherproofing properties over cured or "green" concrete masonry surfaces. This coating can be applied, most preferably, over concrete, cement plaster, block, brick, wood, and other approved or previously painted surfaces. This textured primer may be applied at approximately 55±5 square feet/gallon.

The following examples are provided to further illustrate aspects of the invention. These examples are non-limiting and should not be construed as limiting any aspect of the invention.

EXAMPLE 1

Preparation of Representative Wall Paints

A. Preparation of TEX•COTE® SUPER•COTE™

The SUPER•COTE™ base coat was prepared as a 100% acrylic coating having approximately 47% solids by weight, 37% solids by volume. The SUPER•COTE™ contains about 5% organic solvent, and 22% weight percent pigment (pigments include metal oxide pigments, titanium dioxide, and fillers such as formed silica, titanium extenders, and clay). The density of SUPER•COTE™ is 10.1 pounds per gallon, and the pigment volume content is about 24 percent on average.

Titanium levels were adjusted depending upon the final desired color to be achieved. The solids content was kept approximately the same in all SUPER•COTE™ formulations by using inert fillers. Titanium levels varied from 0% to approximately 20% by weight. Fumed silica was used to adjust gloss. Viscosity adjustments were made by adjustment with HEUR viscosity modifiers.

Various colored SUPER•COTE™ formulations were achieved by combining the above described base coat with approximately 0.1 to 10 percent of metal oxide pigment(s).

For a light, off white color (i.e. Pearly Gates), the following formulation, by weight, was mixed together:

| Base coat (20% titanium) | 99.2% |
| Nickel Antimony Titanium Yellow Rutile | 0.2% |
| Chrome Antimony Titanium Buff Rutile | 0.55% |
| Modified Hematite | 0.05% |

For a light tan (i.e. Light Coffee) color, the following formulation, by weight, was mixed together:

| Base coat (3% titanium) | 98.6% |
| High IR Red Iron Oxide | 0.1% |
| Chrome Antimony Titanium Buff Rutile | 0.8% |
| Pigment Green Cobalt Chrome | 0.5% |

For a medium to dark gray color (i.e. Slate Gray) the following formulation, by weight, was mixed together:

| Base Coat (3% titanium) | 93.8% |
| High IR Red Iron Oxide | 0.5% |
| Pigment Green 26 Cobalt Chrome | 3.1% |
| Modified Hematite | 2.6% |

For a black color (i.e. Onyx Black), the following formulation, by weight, was mixed together:

| Base Coat (0% titanium) | 90% |
| Modified Hematite | 10% |

B. Preparation of TEX•COTE® TRIM•COTE™

The TRIM•COTE™ basecoat is prepared as a 100% acrylic coating having approximately 43% solids by weight, 36% solids by volume. The TRIM•COTE™ contains about 5% organic solvent, and 22% weight percent pigment (pigments include metal oxide pigments, titanium dioxide, and fillers such as formed silica, titanium extenders, and clay). The density of TRIM•COTE™ is about 9.6 pounds per gallon, and the pigment volume content is about 10 percent on average.

Titanium levels are adjusted depending upon the final desired color to be achieved. The solids content is kept approximately the same in all TRIM•COTE™ formulations by using inert fillers. Titanium levels vary from 0% to approximately 20% by weight. Fumed silica is used to adjust gloss. Viscocity adjustments are made by adjustment with HEUR viscosity modifiers.

Various colored TRIM•COTE™ formulations are achieved by combining the above described basecoat with approximately 0.1 to 10 percent of metal oxide pigment(s). Colored formulations for TRIM•COTE™ are prepared in the same manner used for SUPER•COTE™.

EXAMPLE 2

Application of Representative Paints to Vertical Walls

A. Installation

TEX•COTE® SUPER•COTE™ can be applied by brush, roller, or commercial grade airless. Coverage rates vary between 160 to 250 square feet per gallon, depending on surface porosity and texture. Commercial grade airless tip sizes that can be used are 0.017 to 0.019.

B. Surface Preparation

All surfaces are sound, clean, and dry prior to application of TEX•COTE® SUPER•COTE™. All loose, flaking, or oxidized paint are removed from surface by sand blasting, water blasting, wire brushing, or scraping. Large cracks, holes and voids are filled in with cement patching compounds. Texture of patch matches the existing surface. Cracks less than ⅛" (3.2 mm) are filled.

All surfaces are primed with SUPER•COTE™ CLASSIC or Textured Primer, or other manufacturer approved primers for non-masonry surfaces.

C. Application

Over a dry, clean, properly prepared surface, SUPER•COTE™ is applied at an application rate of approximately 160 to 250 square feet per gallon. Application is at uniform film thickness over the entire vertical wall. A wet edge is maintained during spraying (brushing or rolling) at all times. To prevent lap marks, starting and stopping midway is avoided on vertical walls. On large areas, two people spray simultaneously to avoid lap marks and spray patterns.

When rolling on SUPER•COTE™, a fully loaded roller is applied in vertical strokes initially, and is then cross rolled for even film, ending with vertical strokes. To prevent lap marks, application proceeded as above and continued to a "natural break" such as panel edge, seam, or corner.

D. Drying/Curing Times

Drying to the touch occurs in approximately 2 hrs. after application. For drying to hardness, a minimum of approximately 24 hrs. is needed after application.

After 24 hours, residual matters in film will continue to cure with additional days of drying. Times are based on ideal weather.

EXAMPLE 3

Comparison Study in Two Representative Climate Zones

The following is an exemplary theoretical analysis of the use of the wall paints described herein.

A comparison study of two test buildings, each in a representative climate zones, Miami, Fla. and Los Angeles, Calif., is conducted. Each of the four faces of the test building is divided into two equal area and each area is coated either with a heat reflective wall paint of the present invention or a non-heat reflective wall paint of the same color.

Each test building is monitored for at least one year. Reflectance and emittance measurements are collected semi-annually. Temperatures on the wall surfaces and inside the building is measured and logged into a data acquisition system. Heat flow measurements are obtained by heat flux transducers, which are embedded in the walls. Total air-conditioning, as well as ancillary building power demand are recorded to document the cost savings for walls coated with heat reflective wall paints of the present invention. A pyranometer is mounted proximally to the test building to monitor solar irradiance. Thermal scans of the test building are taken to determine the relative heat influx of the two different wall systems. Thermal scans are also used to record the overall thermal performance as the wall system ages.

Tables 1 and 2 below summarize the predicted energy estimates for cooling and supply fans for test houses in Los Angeles and Miami, respectively. These predicted estimates are generated using an hourly building energy simulation program called VisualDOE 3.1. This programs is a whole building energy analysis program that uses hourly weather data to calculate energy consumption due to internal and external energy loads.

TABLE 1

PREDICTED COOLING AND FAN ENERGY IN LOS ANGELES TEST BUILDING

| | Cooling Energy (kWh) | Fan Energy (kWh) | Total Energy (kWh) |
|---|---|---|---|
| Conventional gray paint | 5,903 | 1,762 | 7,665 |
| Gray colored wall paint of the invention | 4,483 | 1,407 | 5,890 |
| Savings | 1,420 (24%) | 355 | 1,775 (23.2%) |

TABLE 2

PREDICTED COOLING AND FAN ENERGY IN MIAMI TEST BUILDING

| | Cooling Energy (kWh) | Fan Energy (kWh) | Total Energy (kWh) |
|---|---|---|---|
| Conventional gray paint | 11,626 | 2,592 | 14,218 |
| Gray colored wall paint of the invention | 11,354 | 2,528 | 13,882 |
| Savings | 272 (2.3%) | 64 | 336 (2.4%) |

Wall paints of the present invention show a lower cooling energy requirement than conventional paints of the same color in both Los Angeles and Miami. Overall, the total annual energy savings for the test building in Los Angeles is 24%, whereas the total energy savings in Miami is 2.3%. Maximum energy savings in walls coated with wall paints of the present can occur in the summer months of May through September when cooling energy is typically used most.

The invention illustratively described herein may be practiced in the absence of any element or elements, limitation or limitations which is not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

The contents of the articles, patents, and patent applications, and all other documents and electronically available information mentioned or cited herein, are hereby incorporated by reference in their entirety to the same extent as if each individual publication was specifically and individually indicated to be incorporated by reference. Applicants reserve the right to physically incorporate into this application any and all materials and information from any such articles, patents, patent applications, or other documents.

The inventions illustratively described herein may suitably be practiced in the absence of any element or elements, limitation or limitations, not specifically disclosed herein. Thus, for example, the terms "comprising", "including," containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

In addition, where features or aspects of the invention are described in terms of Markush groups, those skilled in the art will recognize that the invention is also thereby described in terms of any individual member or subgroup of members of the Markush group.

Other embodiments are set forth within the following claims.

What is claimed is:

1. A method of reducing energy consumption in a building comprising:
    coating one or more external vertical walls of said building with a heat reflective wall paint comprising approximately 0.1 to 10 percent of at least one heat reflective metal oxide pigment;
    wherein said pigment comprises a solid solution having a corundum-hematite crystal lattice structure,
    wherein said pigment causes the surface temperature of the resultant coated wall to be lowered relative to the surface temperature of the wall coated with a non-reflective wall paint of the same color such that less energy is consumed to cool the interior of said building.

2. A method of painting an external vertical wall of a building comprising:
    applying a heat reflective wall paint comprising approximately 0.1 to 10 percent of at least one heat reflective metal oxide pigment to said wall,
    wherein said at least one heat reflective metal oxide pigment comprises a solid solution having a corundum-hematite crystal lattice structure.

3. The method of claim 1, wherein said heat reflective wall paint comprises titanium dioxide.

4. The method of claim 1, wherein said heat reflective metal oxide pigment is an oxide of a metal selected from the group consisting of aluminum, antimony, bismuth, boron, chrome, cobalt, gallium, indium, iron, lanthanum, lithium, magnesium, manganese, molybdenum, neodymium, nickel, niobium, silium, tin, vanadium, and zinc.

5. The method of claim 1, wherein said coated wall reflects light of infrared wavelengths.

6. The method of claim 5, wherein said infrared wavelength ranges from 750 to 2500 nm.

7. The method of claim 6, wherein said infrared wavelength ranges from 800 to 2450 nm.

8. The method of claim 7, wherein said infrared wavelength ranges from 900 to 2400 nm.

9. The method of claim 8, wherein said infrared wavelength ranges from 1000 to 2300 nm.

10. The method of claim 9, wherein said infrared wavelength ranges from 1500 to 2000 nm.

11. The method of claim 5, wherein said coated wall exhibits an infrared reflectance above 30%.

12. The method of claim 11, wherein said coated wall exhibits an infrared reflectance above 50%.

13. The method of claim 12, wherein said coated wall exhibits an infrared reflectance above 70%.

14. The method of claim 1, wherein the color of said heat reflective wall paint is not white.

15. The method of claim 14, wherein said heat reflective wall paint is a color tending toward black.

16. The method of claim 1, wherein said heat reflective wall paint is black, blue, green, yellow, red, or any combination thereof.

17. The method of claim 1, wherein said heat reflective wall paint comprises from 35 to 50% solids by weight, and from 30 to 40% solids by volume.

18. The method of claim 17, wherein said heat reflective wall paint comprises from 37 to 47% solids by weight, and from 32 to 38% solids by volume.

19. The method of claim 1, wherein said surface temperature of said resultant coated wall is lowered by at least 20° F.

20. The method of claim 19, wherein said surface temperature of said resultant coated wall is lowered by at least 30° F.

21. The method of claim 20, wherein said surface temperature of said resultant coated wall is lowered by at least 40° F.

22. The method of claim 21, wherein said surface temperature of said resultant coated wall is lowered by at least 50° F.

23. The method of claim 1 further comprising applying a primer to said one or more external vertical walls of said building prior to said coating.

24. The method of claim 23 wherein said primer is white.

25. The method of claim 24 wherein said primer is achromatic and reflects all light of visible wavelengths.

26. The method of claim 23 wherein said primer is applied with a wet thickness of 16 to 20 mil.

27. The method of claim 23 wherein said primer is a textured primer.

28. The method of claim 27 wherein said primer is applied at approximately 50 to 60 square feet/gallon.

29. The method of claim 1 wherein pigmentation in said heat reflective wall paint consists essentially of at least one heat reflective metal oxide pigment.

30. The method of claim 29 wherein said pigmentation in said heat reflective wall paint is provided by a plurality of said heat reflective metal oxide pigments.

* * * * *